United States Patent [19]

Frey

[11] 4,028,163

[45] June 7, 1977

[54] METHOD AND APPARATUS FOR CLADDING A PANEL

[75] Inventor: Markus Frey, Greifensee, Switzerland

[73] Assignee: Conventa-Stiftung, Vaduz, Liechtenstein

[22] Filed: July 21, 1976

[21] Appl. No.: 707,187

[30] Foreign Application Priority Data

July 30, 1975 Switzerland .................. 9979/75

[52] U.S. Cl. .............................. 156/229; 156/494; 242/67.3 F
[51] Int. Cl.² ...................................... B32B 31/00
[58] Field of Search .......... 156/229, 212, 216, 443, 156/494, 475, 522, 486, 163; 264/DIG. 73, 257, 291, 292; 38/102, 102.1, 102.91; 242/67.1 D, 67.3 F

[56] References Cited

UNITED STATES PATENTS

| | | | |
|---|---|---|---|
| 1,942,727 | 1/1934 | Farrell | 242/67.1 D |
| 2,530,043 | 11/1950 | Borkland | 264/292 |
| 3,447,988 | 6/1969 | Salo et al. | 156/229 |
| 3,522,132 | 7/1970 | Cardis | 156/494 |
| 3,574,040 | 4/1971 | Chitwood et al. | 156/212 X |

*Primary Examiner*—David A. Simmons
*Attorney, Agent, or Firm*—Saul Jecies

[57] ABSTRACT

This invention relates to an apparatus for cladding a panel with a web on one or both major surfaces. Such a panel may be a door and the web may be a foil of synthetic plastic material. The surface of the panel to be clad is facing upwardly. The invention also relates to a method of cladding an upwardly facing surface of a panel.

12 Claims, 3 Drawing Figures

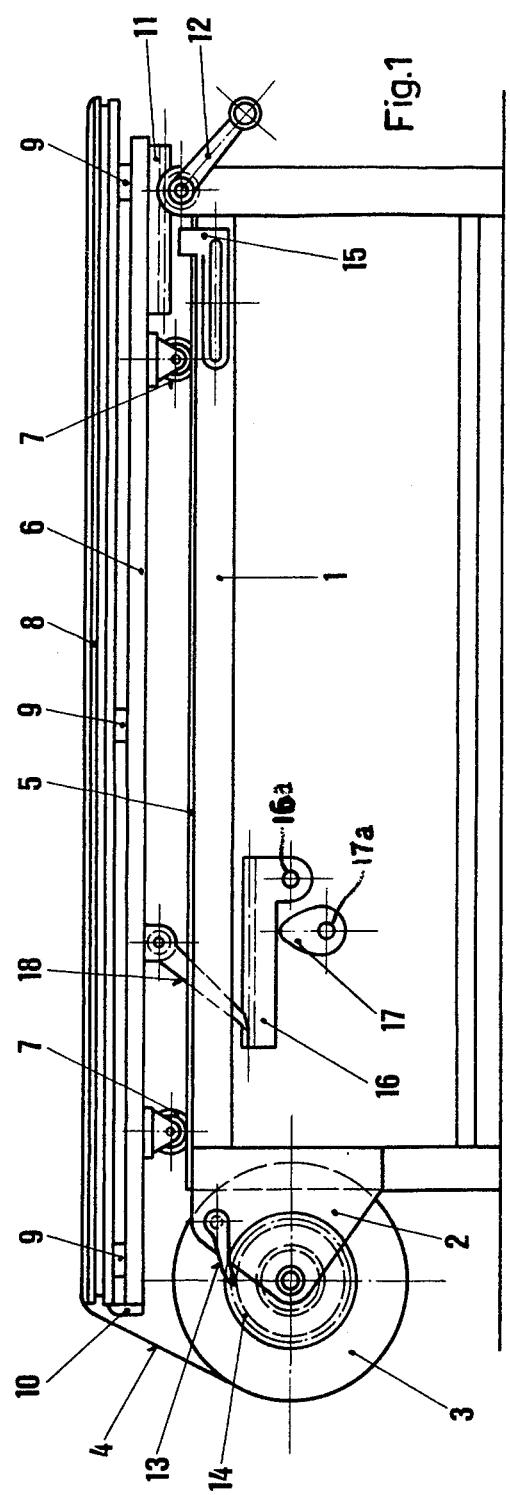
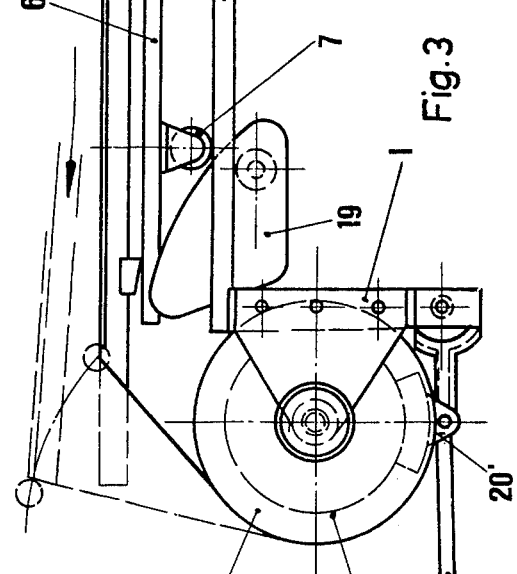
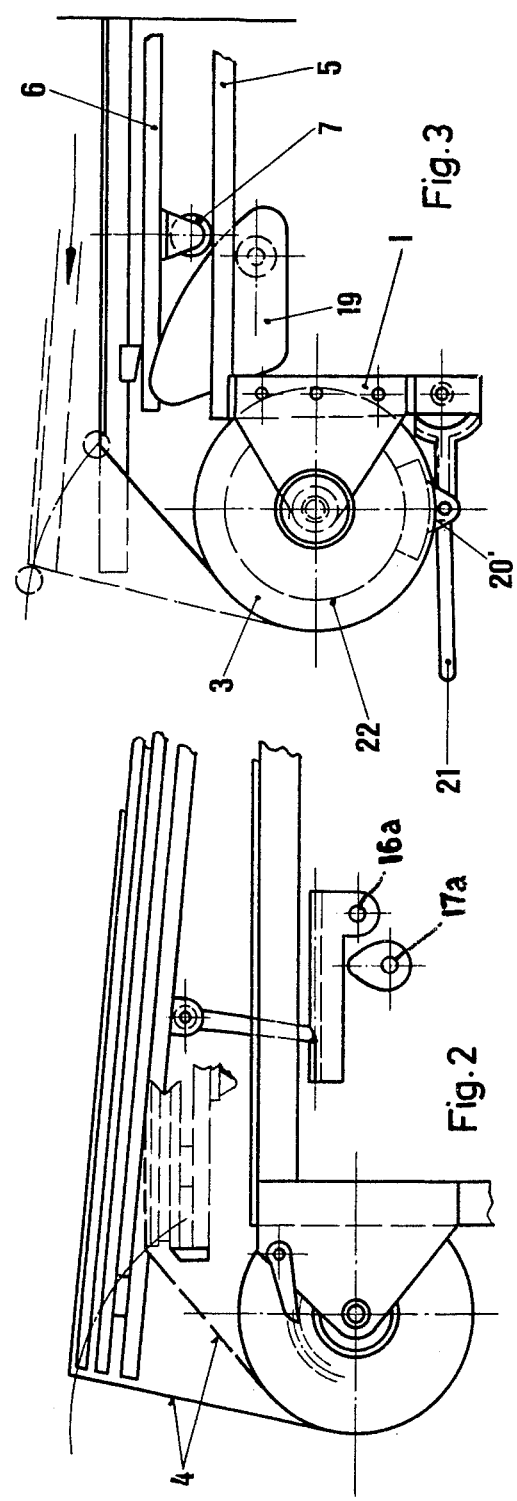

METHOD AND APPARATUS FOR CLADDING A PANEL

BACKGROUND OF THE INVENTION

German Patent Specification 1,571,070 proposes an apparatus having a frame on which a door to be clad with synthetic plastic foil is supported; that side of the door which is to be clad faces downwardly. A supply roll of the foil is turnably mounted between two arms which can be pivoted with it in direction upwardly and downwardly of the frame.

Visual observation of the proper positioning of the foil on the door is, at best, difficult because the side being clad faces downwardly. Even more importantly, stretching of the foil to tighten it in transverse direction of the door, cannot be visually observed. Thus, assuming that the foil has a printed, embossed or otherwise applied pattern, it is very difficult and tedious to determine whether the foil is properly positioned on the door in such a manner that the pattern parallels the longitudinal door edges. Actually, there is no satisfactory way of exercising such control, except to turn over the door; evidently, this requires substantial additional work and increases the manufacturing cost.

The foil being applied to the door must be tensioned to assure that it is smooth and wrinkle-free. The prior-art proposal requires that the tension be maintained, during the application process, by pivoting the rather heavy supply roll upwardly to a position above the door, an operation which either requires more than one operator or power-assist devices which increase the cost of the machine. For the next-following cladding operation the supply must then be returned again to its lower position. Moreover, the desired degree of stretch for the foil, imparted thereto by the position of the supply roll, can at best be controlled only haphazardly, so that non-uniform stretching results in a non-uniform product surface.

The prior-art proposal is therefore not satisfactory and further improvements are desirable.

SUMMARY OF THE INVENTION

It is a general object of this invention to provide such further improvements.

More particularly, it is an object to provide an improved method of cladding a panel, such as a door, with a web, such as a synthetic plastic foil.

A further object is to provide an improved apparatus for carrying out the invention.

Additional objects are to provide an apparatus of this kind which is simple to operate, produces reliably uniform and good results, can be used without difficulty even if heavy foil-supply rolls are employed, permits a simple control of the foil during the cladding operation, and makes possible an exact setting of the degree of stretch which is to be imparted to the web.

In keeping with these and still further objects of the invention, one feature resides in a method of cladding panels, particularly doors, with a synthetic plastic foil, comprising the steps of positioning a panel so that two longitudinal edges thereof extend normal to the axis of rotation of a foil-supply roll; withdrawing a length of foil from the roll and thereafter arresting the roll against rotation; securing a leading end of the length of foil to a transverse edge of the panel which is remote from the roll; shifting the panel substantially in its own plane in a path away from the roll to stretch the length of foil; shifting the panel in the path back towards the roll when a predetermined degree of stretch has been achieved, and at the same time imparting to the panel end facing the roll a movement transverse to the path and away from the roll, to maintain the length of foil stretched; securing the foil intermediate the roll and the panel; and connecting the foil to the other edge of the panel.

Another feature of the invention resides in an apparatus for cladding a panel, particularly a door, with a foil of synthetic plastic material, comprising means for rotatably supporting a supply roll of synthetic plastic foil; guide means extending substantially horizontally from the supply roll in direction normal to the axis of rotation thereof; a carriage movable on the guide means towards and away from the supply roll, so that when a leading end of length of foil withdrawn from the supply roll is secured to the remote edge of a door resting on the carriage and the carriage moves away from the supply roll, the length becomes stretched; and means for uplifting the end of the door which is proximal to the supply roll, in response to movement of the carriage towards the supply roll so as to maintain the length of foil stretched.

The appended drawing shows exemplary embodiments of the invention. However, the scope of the invention is not limited to these embodiments and is, instead, defined in the appended claims.

BRIEF DESCRIPTION OF THE DRAWINGS

FIG. 1 is a side view of an apparatus according to one embodiment; the apparatus is shown in its starting position prior to stretching of the foil;

FIG. 2 is a fragmentary side view of the apparatus in FIG. 1, showing different positions that that of FIG. 1; and FIG. 3 is a view analogous to FIG. 3, but shows a different embodiment.

DESCRIPTION OF THE PREFERRED EMBODIMENTS

One embodiment of the invention is shown in FIGS. 1 and 2. The apparatus in these Figures has a frame 1, one end of which carries a journal 2. A supply roll 3 of synthetic plastic foil 4 is mounted for rotation in journal 2 so that foil can be pulled off the roll 3.

Guide rails 5 (one shown) are provided at the upper end of the substantially horizontal frame 1. A carriage 6 is supported on these rails 5 via rollers 7. A panel, such as the illustrated door 8, which is to be clad on one or both sides (i.e. on one or both of its major surfaces), is placed into the carriage 6, being supported thereon by blocks 9 of wood or the like. No separate retaining devices are necessary to hold the door 8, except that an abutment 10 is provided at the end of carriage 6 which faces towards roll 3, so that the door cannot shift relative to the carriage towards the roll 3 during the stretching of the foil 4.

A rack 11 is mounted on carriage 6 and meshes with a pinion (no numeral) which is fixedly connected to a crank 12, the latter being turnably mounted on frame 1.

The section of foil 4 is pulled off roll 3 and the free end of foil 4 is secured by tacking, bonding or in other suitable manner to the (in the drawing, right-hand) end of door 8. Roll 3 is then turned until the foil section rests flat on door 8 and pawl 13 engages teeth 14. When thereafter the crank is turned in clock-wise direction, starting from the position shown in FIG. 1, motion is transmitted to the carriage 6 via the pinion and the rack 11, causing carriage 6 and door 8 to move to the right in FIG. 1. Rotation of the roll 3 is blocked, once sufficient foil has been withdrawn to attach it to the righ-hand end of the door 8, by a pawl 13 which cooperates with gear teeth 14 provided on roll 3, or rigidly connected to the same for rotation therewith. Therefore, right-ward movement of carriage 6 causes the foil, which extends from roll 3 to the right-hand end of the door 8, to be stretched.

An abutment 15 is mounted on frame 1 so that it can be moved to and arrested in different positions. This abutment cooperates with a portion of carriage 6, e.g. with one of the rollers 7. By setting the abutment to respective different positions, the degree of stretch to be imparted to the foil as the carriage 6 moves to the right, can be selected and is reproducible. Upon completion of its right-ward movement, carriage 6 and door 8 are located in the broken-line position of FIG. 2.

Once stretch has been imparted to the foil, it must be maintained until the foil is so secured to the door that it can no longer relax. For this purpose, a rack 16 is pivoted to frame 1 at 16a. A cam 17 is mounted on frame 1 for turning movement about axis 17a. Depending upon the angular position of cam 17, the cam will either hold the rack 16 in an upwardly pivoted position (see the full lines in FIG. 1) or permit it to pivot downwardly. An arm 18 (there may be two, transversely spaced from each other) is pivoted to carriage 6 adjacent that end thereof which faces toward the roll 3. It pivots downwardly, and its free end engages teeth of the rack 16 when carriage 6 moves to the left after the foil has been stretched to the desired extent. This point of engagement between rack 16 and lower end of arm 18 now constitutes a pivot joint about which the arm moves to the substantially upright, solid-line position of FIG. 2 from the broken-line position of FIG. 1. As FIG. 2 shows, this causes the left-hand end of door 8 to be raised, travelling in an arc about the point at which the foil 4 runs off the periphery of supply roll 3. This causes the tension of the foil to be maintained, despite the fact that the carriage 6 is moving left-ward. At the end of this left-ward movement, i.e. when the left-hand end of door 8 has been raised to its maximum height, the foil 4 extends almost vertically between the left-hand door end and the roll 3. The foil is now secured to the left-hand end of door 8 and cut off intermediate the door and the roll 3.

To complete the operation, the cam 17 is turned to its position in which it permits the rack 16 to pivot downwardly. This results in carriage 6 moving from the raised position of FIG. 2 to the normal position of FIG. 1. The foil 4 on door 8 can now be everywhere secured to door 8, if necessary after first undergoing transverse stretching (e.g. manually).

The embodiment of FIG. 3 is structurally the same as the one on FIGS. 1 and 2, except that the arm 18 has been replaced by two lift cams 19 (one shown), one at each rail 5. The cams 19 are pivotally mounted on frame 1.

When carriage 6 moves to the right, cams 19 are pivoted downwardly and are thus inactive. Before the (left-ward) return movement of carriage 6 begins, cams 19 are pivoted upwardly to their solid-line position and arrested in this position in a suitable manner. Abutments provided on the carriage, e.g. rollers 7, encounter the cams 19 and move upwardly along the cam faces thereof. This causes the carriage 6 and the door thereon to perform the movement which was described with reference to FIGS. 1–2, for the same purposes. To lower the carriage, the cams 19 are released and allowed to pivot downwardly.

A further difference in FIG. 3 is the use of a drum brake 20 in lieu of the pawl 13 of FIGS. 1–2. A brake drum 22 is mounted on or forms part of the supply roll 3 and a lever 21 is used to urge the jaw of the brake into engagement with the drum 22. This permits the roll 3 to be arrested in any desired angular position, instead of only certain positions which are dictated by spacing between consecutive teeth 14.

On both embodiments provision can be made to clamp or otherwise releasably secure the door 8 to carriage 6, e.g. if the door is lightweight and/or if the foil requires relatively strong stretching, so as to prevent displacement of the door relative to the carriage. Lifting-off of the rollers 7 from the rails 5 (or separation of otherwise configurated guide elements from one another) can be prevented in order to preclude possible disengagement of the rack 11 with the cooperating pinion. For example, additional rails may be provided on frame 1 which prevent such lifting-off of the rollers 7.

Whenever a manual operation has been shown or described, a power-assisted operation may be substituted. These operations can also be automated to reduce labor costs. For example, electrical or pneumatic drives may be provided for movement of the carriage 6, pivoting of rack 16 or cams 19, arresting of the roll 3. These drives can be operated from a central control station, either by an operator or by a program-control device.

Should it be necessary to supply heat to the foil, it is a simple matter to mount heaters — e.g. infrared radiators — above the path of movement of carriage 6 so that the entire foil length on the door 8 is uniformly heated.

The inventive apparatus makes it possible to clad each major surface of the door in a single operation. Lifting and/or turning of the door is necessary only to clad the other major surface or to put a new door in position.

Evidently, the invention is not limited to cladding of doors; it could be used on panels, frames or the like. In all cases the longitudinal and transverse edges of the workpiece are clad and finished in the same operation in which a major surface (or major side) of the workpiece is clad.

The supply roll 3 remains in position until the entire foil supply is used up; raising and lowering of the roll is not required. Since the length of the path of movement tensions the foil, and since this length can be precisely predetermined, the foil will always be uniformly tensioned. When the cams 19 are used, their cam faces can be so configurated as to produce an optimum path of movement during the upward displacement of the (in the drawing left-hand) end of the carriage. In other words, this end can be made to so move as to maintain the previously applied foil tension while folding the foil about the (left-hand) transverse door edge.

To facilitate installation and removal of heavy supply rolls, the roll 3 may be rotatably mounted in a device which can be detached from the frame 1 and can be moved (e.g. on rollers) to and from a station at which an empty roll can be conveniently exchanged for a new roll. While this takes place a similar second device bearing a new roll, can be connected to the frame 1 to reduce inactive down-time to a minimum.

Other modifications, besides those mentioned above, will also present themselves to those skilled in the art and are intended to be embraced in the following claims.

I claim:

1. A method of cladding panels, particularly doors, with a synthetic plastic foil, comprising the steps of
    positioning a panel so that two longitudinal edges thereof extend normal to the axis of rotation of a foil supply roll;
    withdrawing a length of foil from said roll and thereafter arresting said roll against rotation;
    securing a leading end of said length of foil to a transverse edge of said panel which is remote from said roll;
    shifting said panel substantially in its own plane in a path away from said roll to stretch said length of foil;
    shifting said panel in said path back towards said roll when a predetermined degree of stretch has been achieved, and at the same time imparting to the panel end facing said roll a movement transverse to said path and away from said roll, to maintain said length of foil stretched;
    securing the foil intermediate said roll and said panel; and
    connecting said foil to the other edge of said panel.

2. Apparatus for cladding a panel, particularly a door, with a foil of synthetic plastic material, comprising
    means for rotatably supporting a supply roll of synthetic plastic foil;
    guide means extending substantially horizontally from said supply roll in direction normal to the axis of rotation thereof;
    a carriage movable on said guide means towards and away from said supply roll, so that when a leading end of a length of foil withdrawn from said supply roll is secured to the remote edge of a door resting on said carriage and the carriage moves away from said supply roll, said length becomes stretched; and
    means for uplifting the end of the door which is proximal to said supply roll, in response to movement of said carriage towards said supply roll so as to maintain said length of foil stretched.

3. Apparatus as defined in claim 2; and further comprising means for imparting motion to said carriage.

4. Apparatus as defined in claim 3, wherein said motion-imparting means comprises a cam on one end and a meshing rack on the other of said carriage and frame, respectively.

5. Apparatus as defined in claim 2; and further comprising cooperating abutments on said carriage and said frame, respectively.

6. Apparatus as defined in claim 2, wherein said means for uplifting comprises a member pivotably mounted on said end of said member pivotably mounted on said end of said carriage, and engaging portions on said frame and with which said member engages when said carriage moves towards said supply roll, whereby continued movement of said carriage towards said supply roll causes said member to pivot to an upright position.

7. Apparatus as defined in claim 6, wherein said engaging portions are downwardly movable relative to said carriage.

8. Apparatus as defined in claim 6, wherein said engaging portions are teeth on a gear rack.

9. Apparatus as defined in claim 2, wherein said means for uplifting comprises an abutment member on said carriage, and a cam having a cam face positioned to engage said abutment member during movement of said carriage towards said supply roll, said abutment member riding up on said cam face.

10. Apparatus as defined in claim 9, wherein said guide means comprises rails and said carriage includes rollers which engage and move on said rolls, said abutment member being constituted by one of said rollers.

11. Apparatus as defined in claim 2; and further comprising means for selectively arresting said supply roll against rotation.

12. Apparatus as defined in claim 2, wherein said mounting means is detachably connected to said frame so as to be attachable to and detachable from said frame while said supply roll remains mounted in said mounting means.

* * * * *